(12) United States Patent
Gilbert-Eyres et al.

(10) Patent No.: US 12,703,325 B2
(45) Date of Patent: Aug. 11, 2026

(54) INTELLIGENT WINDSHIELD WIPER CONTROL SYSTEMS AND METHODS

(71) Applicant: GM GLOBAL TECHNOLOGY OPERATIONS LLC, Detroit, MI (US)

(72) Inventors: Matthew Edward Gilbert-Eyres, Rochester, MI (US); Alec M. Wuorinen, Columbus, OH (US); Craig Thomas Douglas, Pflugerville, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/800,340

(22) Filed: Aug. 12, 2024

(65) Prior Publication Data

US 2026/0042421 A1 Feb. 12, 2026

(51) Int. Cl.
*B60S 1/08* (2006.01)
*G06V 20/59* (2022.01)

(52) U.S. Cl.
CPC .......... *B60S 1/0844* (2013.01); *G06V 20/597* (2022.01)

(58) Field of Classification Search
CPC ..... B60S 1/00; B60S 1/02; B60S 1/04; G06V 20/597
See application file for complete search history.

(56) References Cited

U.S. PATENT DOCUMENTS

2007/0115357 A1* 5/2007 Stein ..................... B60S 1/0844 348/148
2015/0066293 A1* 3/2015 Davies .................... B60S 1/481 701/36
2018/0345916 A1* 12/2018 Giraud .................... B60S 1/485
2019/0047518 A1* 2/2019 Kosiak .................. B60S 1/0844
2020/0130649 A1* 4/2020 Takahashi ............. B60S 1/0818
2023/0373504 A1* 11/2023 Diamond .............. B60W 50/14
2025/0269821 A1* 8/2025 Schroeter .............. B60S 1/0825

FOREIGN PATENT DOCUMENTS

DE 102014218984 A1 3/2015
DE 102013001383 B4 3/2016

OTHER PUBLICATIONS

German Office Action from counterpart DE1020241286547, dated Apr. 2, 2025.

* cited by examiner

*Primary Examiner* — Peter D Nolan
*Assistant Examiner* — Ce Li Li

(57) ABSTRACT

A control system for windshield wipers of a vehicle includes: a gaze module configured to determine a present gaze of a driver toward a front windshield of the vehicle based on a first image from a first camera facing the driver; an obstruction zone module configured to, based on the present gaze, determine an obstruction zone through which the driver is looking through the front windshield; an obstruction module configured to, based on a second image from a second camera facing the front windshield, determine whether vision through the obstruction zone is obstructed; a frequency module configured to determine a frequency at which to begin cycles of the windshield wipers of the front windshield in response to a determination that vision through the obstruction zone is obstructed; and an actuator control module configured to actuate the windshield wipers of the front windshield based on the frequency.

20 Claims, 7 Drawing Sheets

INTELLIGENT WINDSHIELD WIPER CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle control systems and more particularly to systems and methods for controlling windshield wipers of vehicles.

Vehicles include one or more torque producing devices, such as an internal combustion engine and/or an electric motor. A passenger of a vehicle rides within a passenger cabin (or passenger compartment) of the vehicle.

Vehicles may include one or more different types of sensors that sense vehicle surroundings. One example of a sensor that senses vehicle surroundings is a camera configured to capture images of the vehicle surroundings. Examples of such cameras include forward-facing cameras, rear-facing cameras, and side facing cameras. Another example of a sensor that senses vehicle surroundings includes a radar sensor configured to capture information regarding vehicle surroundings. Other examples of sensors that sense vehicle surroundings include sonar sensors and light detection and ranging (LIDAR) sensors configured to capture information regarding vehicle surroundings.

SUMMARY

In a feature, a control system for windshield wipers of a vehicle includes: a gaze module configured to determine a present gaze of a driver toward a front windshield of the vehicle based on a first image from a first camera facing the driver; an obstruction zone module configured to, based on the present gaze, determine an obstruction zone through which the driver is looking through the front windshield; an obstruction module configured to, based on a second image from a second camera facing the front windshield, determine whether vision through the obstruction zone is obstructed; a frequency module configured to determine a frequency at which to begin cycles of the windshield wipers of the front windshield in response to a determination that vision through the obstruction zone is obstructed; and an actuator control module configured to actuate the windshield wipers of the front windshield based on the frequency.

In further features, the obstruction zone module is configured to set the obstruction zone based on a predetermined shape of predetermined dimensions centered at a point where the present gaze of the driver intersects the front windshield.

In further features, the predetermined shape is a rectangle.

In further features, the frequency module is configured to set the frequency based on (a) a frequency modifier value and (b) an initial frequency at which to begin cycles of the windshield wipers of the front windshield.

In further features, the frequency module is configured to set the frequency based on one of (a) the frequency modifier value plus the initial frequency and (b) the frequency modifier value multiplied by the initial frequency.

In further features, the frequency module is configured to determine the initial frequency based on a number of cycles of the windshield wipers performed since the obstruction zone became obstructed.

In further features, the frequency module is configured to increase the initial frequency as the number of cycles increases.

In further features, the frequency module is configured to determine the initial frequency based on a period that vision through the obstruction zone has been obstructed.

In further features, the frequency module is configured to increase the initial frequency as the period increases.

In further features, a modifier module is configured to determine the frequency modifier value based on a weather condition in front of the vehicle.

In further features, the modifier module is configured to increase the frequency modifier value when the weather condition in front of the vehicle includes rain.

In further features, a modifier module is configured to determine the frequency modifier value based on a type of a second vehicle that is in front of the vehicle.

In further features, the modifier module is configured to increase the frequency modifier value when the type of vehicle is one of a predetermined group of types of vehicles.

In further features, a modifier module is configured to determine the frequency modifier value based on a traffic condition in front of the vehicle.

In further features, the modifier module is configured to increase the frequency modifier value when the traffic condition in front of the vehicle includes more than a predetermined amount of traffic.

In further features, a modifier module is configured to determine the frequency modifier value based on a present speed of the vehicle.

In further features, the modifier module is configured to increase the frequency modifier value as the present speed of the vehicle increases.

In further features, a modifier module is configured to determine the frequency modifier value based on a second frequency of beginning cycles of second windshield wipers of a second front windshield of a second vehicle in front of the vehicle.

In a feature, a control system for windshield wipers of a vehicle, the control system includes: a gaze module configured to determine a present gaze of a driver toward a front windshield of the vehicle based on a first image from a first camera facing the driver; an obstruction zone module configured to, based on the present gaze, set an obstruction zone through which the driver is looking through the front windshield based on a predetermined shape of predetermined dimensions centered at a point where the present gaze of the driver intersects the front windshield; an obstruction module configured to, based on a second image from a second camera facing the front windshield, determine whether vision through the obstruction zone is obstructed; a frequency module configured to determine a frequency at which to begin cycles of the windshield wipers of the front windshield in response to a determination that vision through the obstruction zone is obstructed; an actuator control module configured to actuate the windshield wipers of the front windshield based on the frequency, where the frequency module is configured to set the frequency based on (a) a frequency modifier value and (b) an initial frequency at which to begin cycles of the windshield wipers of the front windshield, where the frequency module is configured to set the frequency based on one of (a) the frequency modifier value plus the initial frequency and (b) the frequency modifier value multiplied by the initial frequency, where the frequency module is configured to determine the initial frequency based on (a) a period that vision through the obstruction zone has been obstructed and (b) a number of cycles of the windshield wipers performed since the obstruction zone became obstructed; and a modifier module configured to determine the frequency modifier value based on at least one of: a weather condition in front of the vehicle; a type of a second vehicle that is in front of the vehicle; a traffic condition in front of the vehicle; a present speed of the vehicle; and a second frequency of beginning cycles of second windshield wipers of a second front windshield of a second vehicle in front of the vehicle.

In a feature, a control method for windshield wipers of a vehicle, the control method includes: determining a present gaze of a driver toward a front windshield of the vehicle based on a first image from a first camera facing the driver; based on the present gaze, determining an obstruction zone through which the driver is looking through the front windshield; based on a second image from a second camera facing the front windshield, determining whether vision through the obstruction zone is obstructed; determining a frequency at which to begin cycles of the windshield wipers of the front windshield in response to a determination that vision through the obstruction zone is obstructed; and actuating the windshield wipers of the front windshield based on the frequency.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Vehicles include one or more windshields, such as a front windshield and a rear windshield. When moving in a forward direction, a driver looks through the front windshield. Windshield wipers can be used to clear the front windshield to increase visibility through the front windshield. The present application involves systems and methods for automatically and predictively actuating windshield wipers of a front windshield of the vehicle in response to detecting that the vision of the driver through a portion of the front windshield is obstructed. This automatically and predictively clears the front windshield and increases visibility of the driver through the front windshield.

Figure 1:
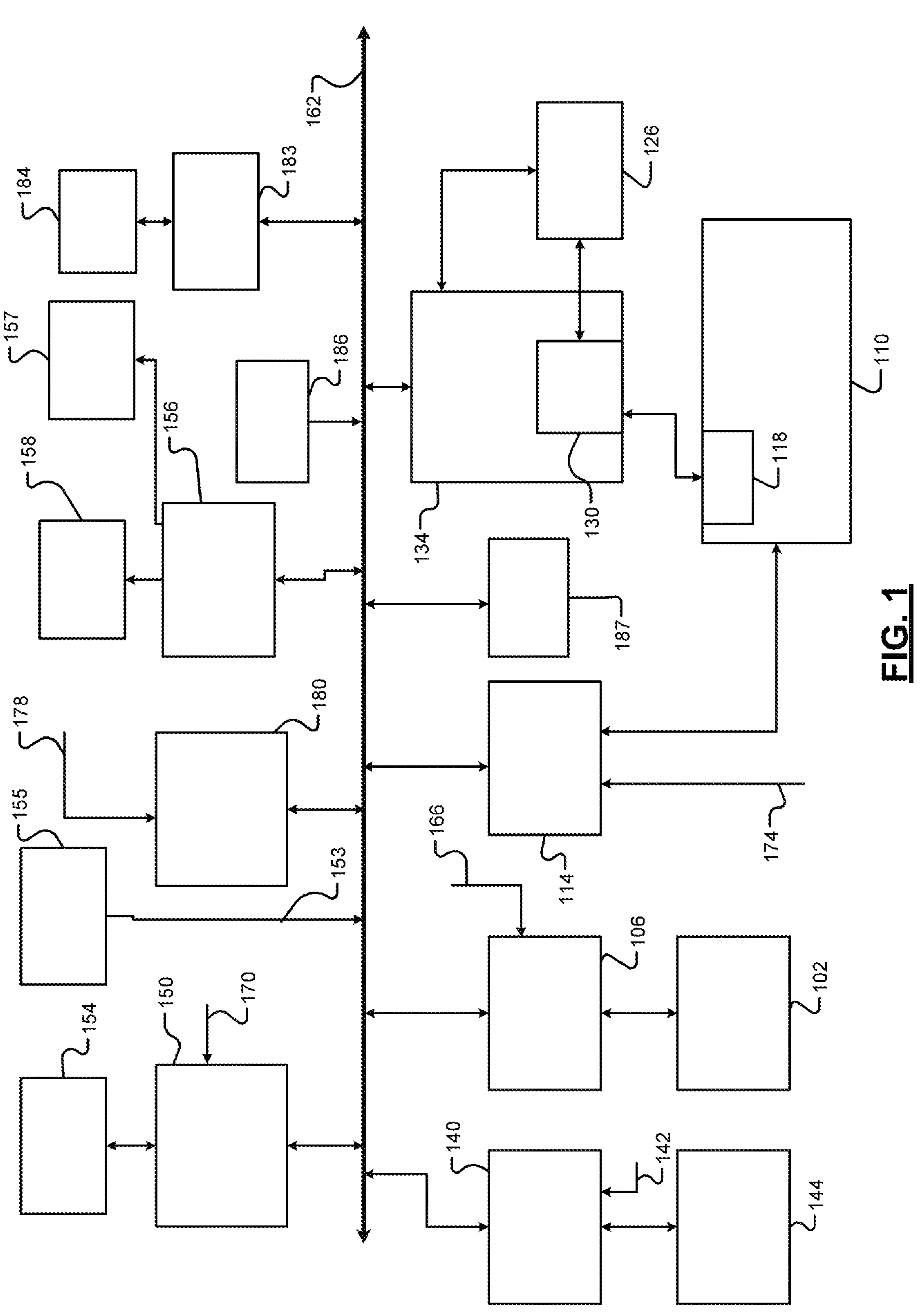
FIG. 1 is a functional block diagram of an example vehicle system.

Referring now to FIG. 1, a functional block diagram of an example vehicle system is presented. While a vehicle system for a hybrid vehicle is shown and will be described, the present application is also applicable to non-hybrid vehicles, electric vehicles, fuel cell vehicles, and other types of vehicles. The present application is applicable to autonomous vehicles, semi-autonomous vehicles, non-autonomous vehicles, shared vehicles, non-shared vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies power from the battery 126 to the electric motor 118 based on signals from the PIM 134, and the PCD 130 provides power output by the electric motor 118, for example, to the battery 126. The PIM 134 may include, for example, an inverter.

A steering control module 140 controls steering/turning of wheels of the vehicle, for example, based on driver turning of a steering wheel within the vehicle and/or steering commands from one or more vehicle control modules. A steering wheel angle (SWA) sensor (not shown) monitors rotational position of the steering wheel and generates a SWA 142 based on the position of the steering wheel. As an example, the steering control module 140 may control vehicle steering via an electronic power steering (EPS) motor 144 based on the SWA 142. However, the vehicle may include another type of steering system.

A brake control module 150 may selectively control (e.g., friction) brakes 154 of the vehicle based on one or more driver inputs, such as a brake pedal position (BPP) 170. Another driver input may be a cruise control input 153 from a cruise control module 155 when cruise control is enabled.

A windshield control module 156 controls whether a windshield wiper actuator 158 is on or off and, if on, a frequency of actuation of the windshield wiper actuator 158. When on, the windshield wiper actuator 158 actuates one or more windshield wipers of a front windshield of the vehicle.

The windshield control module 156 may also control a washer fluid sprayer 157 that sprays windshield washer fluid onto the front windshield.

The windshield control module 156 may control whether the windshield wiper actuator 158 is on or off and the frequency of actuation of the windshield wiper actuator 158 based on user input. According to the present application, the windshield control module 156 controls actuation of the windshield wiper actuator 158 automatically based on one or more other parameters. The windshield control module 156 may also trigger the washer fluid sprayer 157 to spray washer fluid in response to receipt of user input to spray washer fluid. According to the present application, the windshield control module 156 may trigger the washer fluid sprayer 157 to spray washer fluid onto the front windshield automatically based on one or more other parameters. User input may provide a default regarding control of the windshield wiper actuator 158 and the washer fluid sprayer 157.

Modules of the vehicle may share parameters via a network 162, such as a controller area network (CAN). A CAN may also be referred to as a car area network. For example, the network 162 may include one or more data buses. Various parameters may be made available by a given module to other modules via the network 162.

The driver inputs may include, for example, an accelerator pedal position (APP) 166 which may be provided to the ECM 106. The BPP 170 may be provided to the brake control module 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

An infotainment module 183 may output various information via one or more output devices 184. The output devices 184 may include, for example, one or more displays (non-touch screen and/or touch screen), one or more other suitable types of video output devices, one or more speakers, one or more haptic devices, and/or one or more other suitable types of output devices.

The infotainment module 183 may output video via the one or more displays. The infotainment module 183 may output audio via the one or more speakers. The infotainment module 183 may output other feedback via one or more haptic devices. For example, haptic devices may be included with one or more seats, in one or more seat belts, in the steering wheel, etc. Examples of displays may include, for example, one or more displays (e.g., on a front console) of the vehicle, a head up display (HUD) that displays information via a substrate (e.g., windshield), one or more displays that drop downwardly or extend upwardly to form panoramic views, and/or one or more other suitable displays.

The vehicle may include a plurality of external sensors and cameras, generally illustrated in FIG. 1 by 186. One or more actions may be taken based on input from the external sensors and cameras 186. For example, the infotainment module 183 may display video, various views, and/or alerts on a display via input from the external sensors and cameras 186 during driving.

As another example, brake control module 150 and/or the steering control module 140 may apply the brakes 154 and/or steer the vehicle to prevent the vehicle colliding with an object around the vehicle.

The vehicle may include one or more additional control modules that are not shown, such as a chassis control module, a battery pack control module, etc. The vehicle may omit one or more of the control modules shown and discussed.

Figure 2:
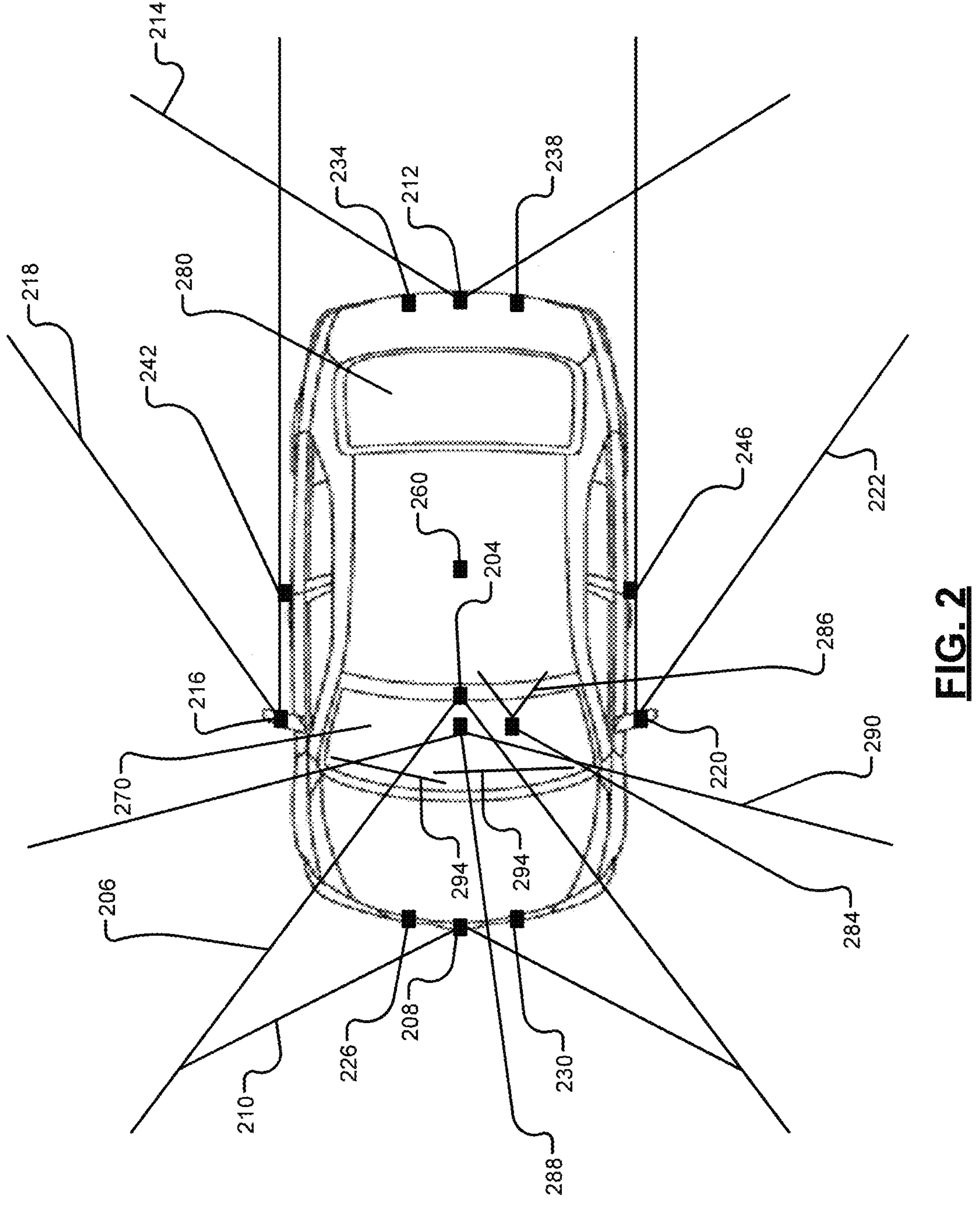
FIG. 2 is a functional block diagram of a vehicle including various external cameras and sensors.

Referring now to FIG. 2, a functional block diagram of a vehicle including examples of external sensors and cameras is presented. The external sensors and cameras 186 (FIG. 1) include various cameras positioned to capture images and video outside of (external to) the vehicle and various types of sensors measuring parameters outside of (external to) the vehicle. Examples of the external sensors and cameras 186 will now be discussed. For example, a forward-facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward-facing camera 204 may be located more rearward, however, such as with a rear-view mirror at a windshield of the vehicle. The forward-facing camera 204 may not be able to capture images and video of items within all of or at least a portion of the predetermined FOV of the front camera 208 and may capture images and video more than the predetermined distance of the front of the vehicle. In various implementations, only one of the forward-facing camera 204 and the front camera 208 may be included.

A rear camera 212 captures images and video within a predetermined FOV 214 behind the vehicle. The rear camera 212 may be located at the rear of the vehicle, such as near a rear license plate.

A right camera 216 captures images and video within a predetermined FOV 218 to the right of the vehicle. The right camera 216 may capture images and video within a predetermined distance to the right of the vehicle and may be located, for example, under a right side rear-view mirror. In various implementations, the right side rear-view mirror may be omitted, and the right camera 216 may be located near where the right side rear-view mirror would normally be located.

A left camera 220 captures images and video within a predetermined FOV 222 to the left of the vehicle. The left camera 220 may capture images and video within a predetermined distance to the left of the vehicle and may be located, for example, under a left side rear-view mirror. In various implementations, the left side rear-view mirror may be omitted, and the left camera 220 may be located near where the left side rear-view mirror would normally be located.

While the example FOVs are shown for illustrative purposes, the present application is also applicable to other FOVs. In various implementations, FOVs may overlap, for example, for more accurate and/or inclusive stitching.

The external sensors and cameras 186 may additionally or alternatively include various other types of sensors, such as light detection and ranging (LIDAR) sensors, ultrasonic sensors, radar sensors, and/or one or more other types of sensors. For example, the vehicle may include one or more forward-facing ultrasonic sensors, such as forward-facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The vehicle may also include one or more light detection and ranging (LIDAR) sensors, such as LIDAR sensor 260. The locations of the cameras and sensors are provided as examples only and different locations could be used. Ultrasonic sensors output ultrasonic signals around the vehicle.

The external sensors and cameras 186 may additionally or alternatively include one or more other types of sensors, such as one or more sonar sensors, one or more radar sensors, and/or one or more other types of sensors.

The vehicle includes one or more windshields. In the example of FIG. 2, the vehicle includes a front windshield 270 and a rear windshield 280. In various implementations, the rear windshield 280 may be omitted.

The vehicle also includes a driver facing camera 284 that faces a driver's seat within the passenger cabin and captures images and video of images within a predetermined FOV 286 including the driver's seat (e.g., including the driver's head and eyes). The vehicle also includes a windshield facing camera 288 that faces the front windshield 270 and captures images within a predetermined FOV 290. The front windshield 270 (e.g., all of the front windshield) is within the predetermined FOV 290. While the example FOVs are shown for illustrative purposes, the present application is also applicable to other FOVs. In various implementations, FOVs may overlap, for example, for more accurate and/or inclusive stitching. Example windshield wipers are illustrated by 294.

Figure 3:
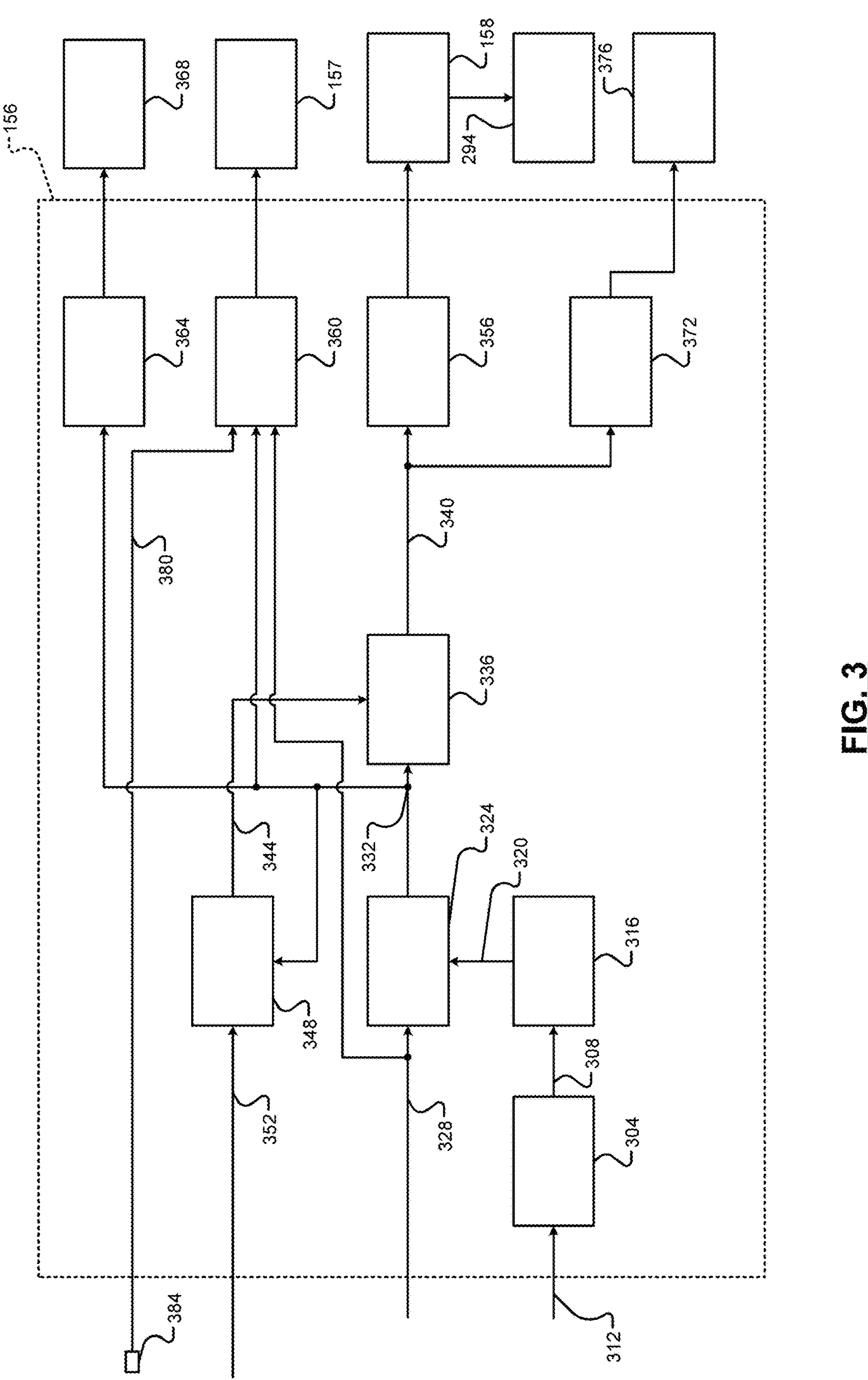
FIG. 3 is a functional block diagram of an example implementation of a windshield control module.

FIG. 3 is a functional block diagram of an example implementation of the windshield control module 156. A gaze module 304 determines a present gaze 308 of eyes of the driver based on a driver image 312 from the driver facing camera 284. The gaze module 304 may update the gaze 308 each time a driver image 312 is captured. The gaze 308 may be, for example, a vector indicating a direction that pupils of eyes of the driver are looking.

An obstruction zone module 316 determines an obstruction zone 320 on the front windshield 270 based on the gaze 308 of the driver. The obstruction zone module 316 may update the obstruction zone 320 each time the gaze 308 is updated. For example, the obstruction zone module 316 may determine a point where the gaze 308 intersects the front windshield 270. The obstruction zone module 316 may set the obstruction zone 320 to a rectangle or square of predetermined dimensions centered vertically and horizontally at the point.

An obstruction module 324 determines whether the obstruction zone 320 is obstructed based on a windshield facing image 328 from the windshield camera 288. For example, the obstruction module 324 identifies the obstruction zone 320 in the windshield facing image 328, such as based on differences in positions of the cameras 284 and 288. The obstruction module 324 determines a clarity value based on the portion of the windshield facing image 328 at the obstruction zone 320. The clarity value may correspond to a visibility through the front windshield 270 in the obstruction zone 320. For example, the clarity value may increase as visibility through the windshield 270 in the obstruction zone 320 increases and vice versa. The obstruction module 324 may decrease the clarity value as more material (e.g., water, dirt, dust, bugs, etc.) increases and vice versa.

The obstruction module 324 indicates whether the obstruction zone 320 is obstructed or not based on the clarity value. For example, the obstruction module 324 may set an obstruction indicator 332 to a first state when the clarity value is less than a predetermined value. The obstruction module 324 may set the obstruction indicator 332 to a second state when the clarity value is greater than or equal to the predetermined value. In various implementations, the clarity value may be a value between 0 and 100, respectively, and the predetermined value may be approximately 70 or another suitable value. Other suitable values and ranges of possible values may be used.

A frequency module 336 determines a frequency 340 at which to starting cycles of the windshield wipers 294 based on an initial frequency and a frequency modifier (value) 344. The frequency module 336 determines the initial frequency as discussed further below. A modifier module 348 determines the frequency modifier 344 as discussed further below based on one or more input parameters 352. For example, the frequency modifier 344 may be an offset value or a gain value. In the example of an offset value, the frequency module 336 may set the frequency 340 based on or equal to the initial frequency plus the frequency modifier 344. In the example of a gain value, the frequency module 336 may set the frequency 340 based on or equal to the initial frequency multiplied by the frequency modifier 344. Each cycle of the windshield wipers 294 may include the windshield wipers 294 moving from initial/resting positions to end positions and back to the initial/resting positions.

An actuator control module 356 controls actuation of the windshield wiper actuator 158 and therefore actuation of the windshield wipers 294 based on or at the frequency 340. For example, the actuator control module 356 controls application of electrical power to the windshield wiper actuator 158 to control actuation of the windshield wiper actuator 158.

A fluid control module 360 controls the washer fluid sprayer 157 and therefore the spraying of washer fluid onto the front windshield 270. For example, the fluid control module 360 applies electrical power to the washer fluid sprayer 157 to spray washer fluid onto the front windshield 270.

An alert module 364 outputs one or more alerts via one or more output devices, such as output device 368. For example, the alert module 364 may output an alert visually on one or more displays. Additionally or alternatively, the alert module 364 may audibly output an alert via one or more speakers.

A transceiver module 372 wirelessly transmits various information, such as the frequency 340, to one or more remote locations, such as a remote server. The transceiver module 372 may transmit information via one or more antennas, such as antenna 376. The transceiver module 372 may also wirelessly receive data via one or more antennas. The transceiver module 372 may communicate wirelessly, for example, via a cellular network, a satellite network, a WiFi (e.g., IEEE 802.11 based) network, or in another suitable manner.

Figure 4:
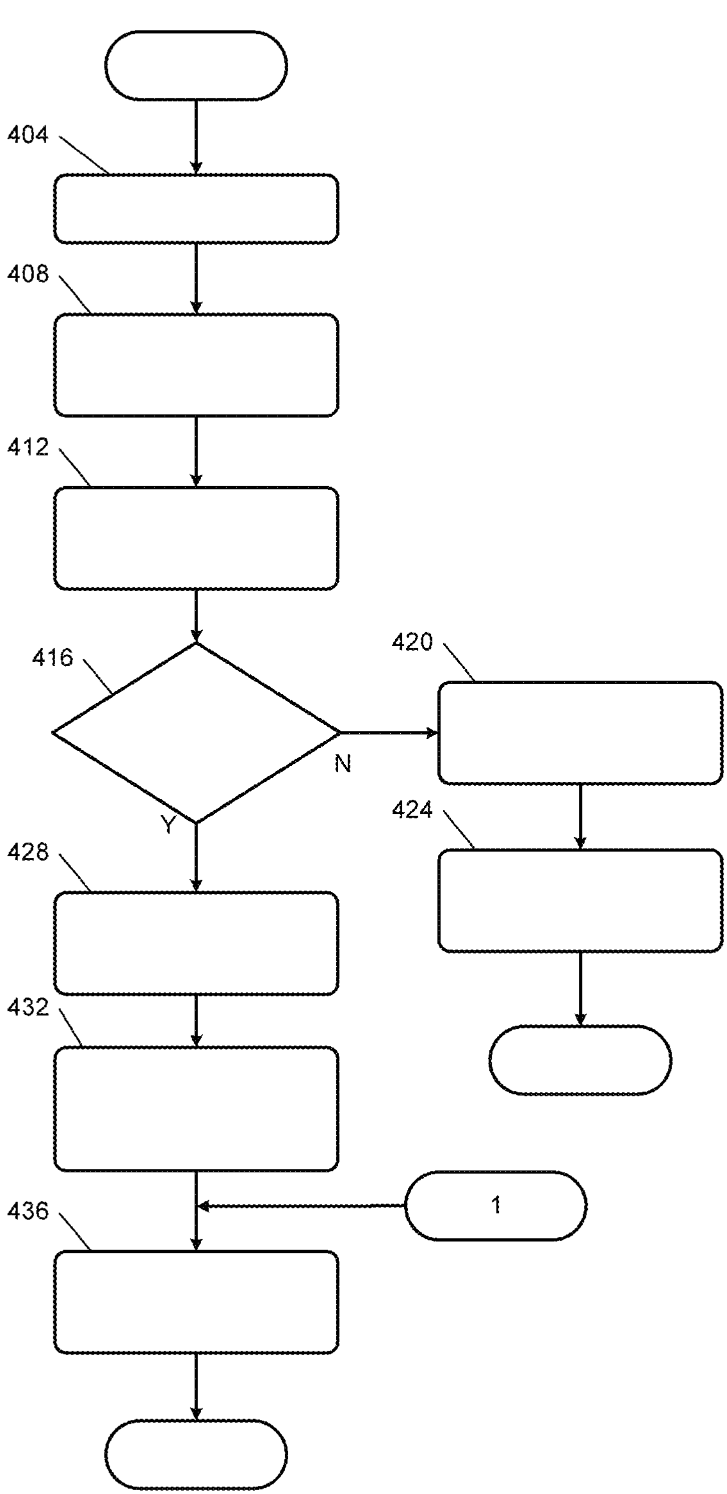
FIG. 4 is a flowchart depicting an example method of controlling actuation of the windshield wipers.

FIG. 4 is a flowchart depicting an example method of controlling actuation of the windshield wipers 294. Control begins with 404 where the gaze module 304 determines the gaze 308 of the driver toward the front windshield 270 based on the driver facing image 312. At 408, the obstruction zone module 316 determines the obstruction zone 320 based on the gaze 308.

At 412, the obstruction module 324 determines the clarity value for the obstruction zone 320 based on the windshield image 328. At 416, the obstruction module 324 may determine whether the clarity value is less than a predetermined value. In other words, the obstruction module 324 determines whether the obstruction zone 320 of the front windshield 270 is obstructed. If 416 is false, the obstruction module 324 indicates that the obstruction zone 320 is not obstructed at 420, and the frequency module 336 maintains the previous value of the frequency 340 at 424. The actuator control module 356 triggers the start of cycles of the windshield wipers 294 based on or at the frequency 340. If 416 is true, control continues with 428.

At 428, the obstruction module 324 indicates that the obstruction zone 320 is obstructed. At 432, the frequency module 336 determines the frequency 340 based on the initial frequency and the frequency modifier 344. The frequency module 336 determines the initial frequency as described above and in conjunction with FIGS. 5 and 6, and the modifier module 348 determines the frequency modifier 344 as described above and in conjunction with FIG. 7. The transceiver module 372 may transmit the determined frequency to the remote server, for example, for use by other vehicles in determining their respective frequency modifiers. At 436, the actuator control module 356 triggers the start of cycles of the windshield wipers 294 based on or at the frequency 340.

Figure 5:
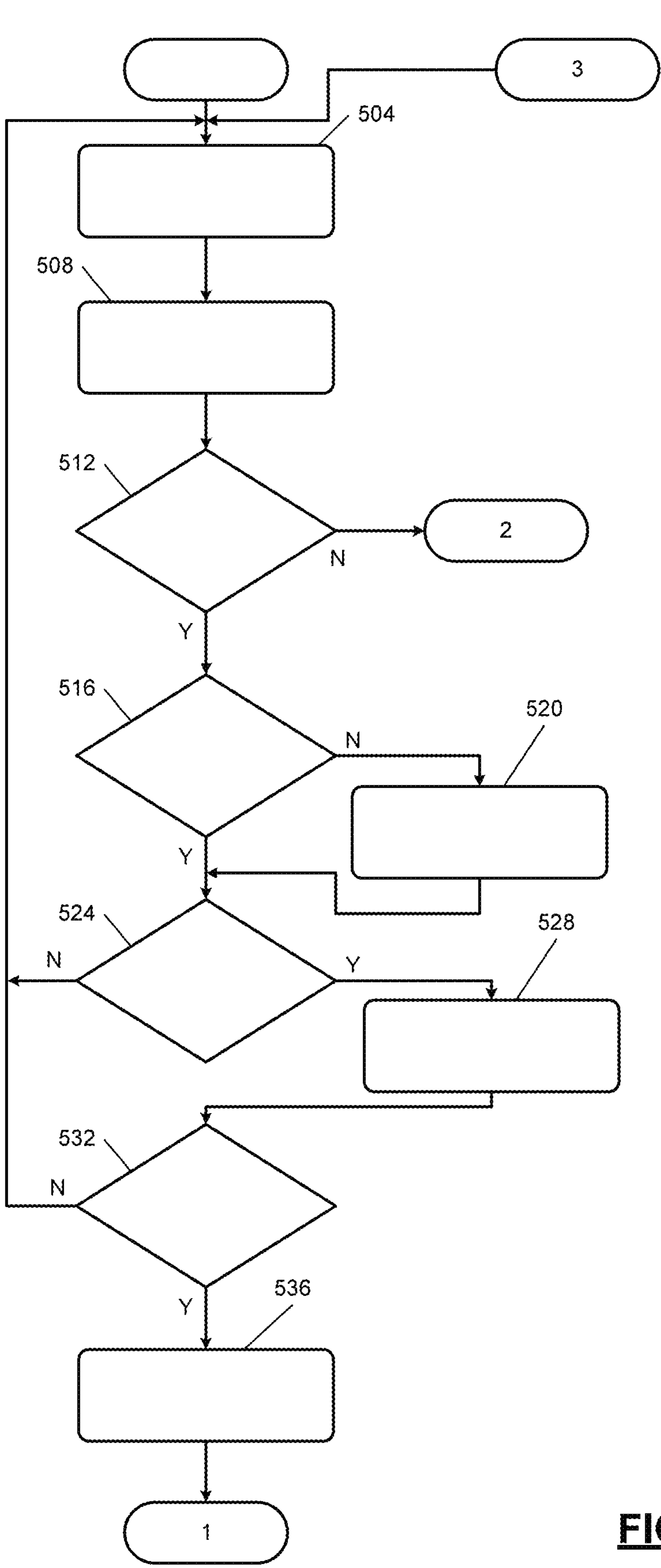
FIGS. 5 and 6 are flowcharts depicting an example method of controlling windshield washer fluid spraying, windshield wiper actuation, and setting the initial frequency.
Figure 6:
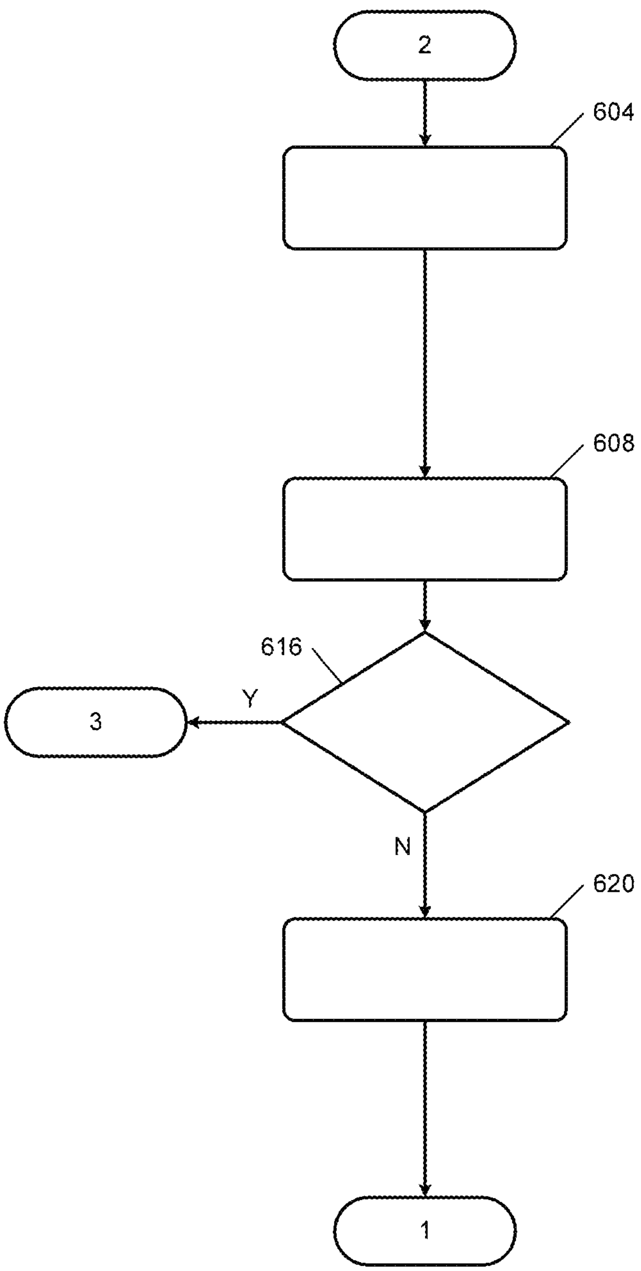

FIGS. 5 and 6 are flowcharts depicting an example method of controlling windshield washer fluid spraying, windshield wiper actuation, and setting the initial frequency. Referring to FIG. 5, control may begin with 504 where the actuator control module 356 triggers one cycle of the windshield wipers 294. For example, the actuator control module 356 may trigger one and only one cycle of the windshield wipers 294 in response to the frequency module 336 setting the frequency 340 to a predetermined value. At 508, the frequency module 336 increments a counter value (counter) by one (e.g., I=I+1). The counter value may therefore track the number of cycles of the windshield wipers 294 performed since the obstruction began.

At 512, the frequency module 336 determines whether the obstruction module 324 is presently indicating that the obstruction zone 320 is obstructed. If 512 is false, control may continue with 2 of FIG. 6. If 512 is true, control may continue with 516.

At 516, the fluid control module 360 may determine whether moisture is present on the windshield 270 in the obstruction zone 320. The fluid control module 360 may determine whether moisture is present on the windshield 270 based on a moisture measurement 380 from a windshield moisture sensor 384 (e.g., moisture measurement greater than a predetermined value) and/or the windshield image 328. If 516 is false, the fluid control module 360 turns on the washer fluid sprayer 157 for a predetermined period at 520 and sprays washer fluid onto the front windshield 270, and control continues with 524. If 516 is true, the fluid control module 360 does not spray washer fluid, and control continues with 524.

At 524, the fluid control module 360 may determine whether the counter value is greater than a first predetermined value (X) and less than a second predetermined value (Y) that is greater than the first predetermined value. The first and second predetermined values may be integers greater than zero and may be calibrated values. If 516 is true, the fluid control module 360 turns on the washer fluid sprayer 157 for a predetermined period at 528 and sprays washer fluid onto the front windshield 270. Also at 528, the alert module 364 may output one or more alerts via one or more output devices, such as an alert that the windshield wipers 294 may not be effective and it might be time to replace the windshield wipers 294. The transceiver module 372 may also transmit present information (e.g., the counter value, the alert, etc.) to the remote server. Control continues with 532. If 516 is false, the fluid control module 360 does not spray washer fluid, and control may return to 504.

At 532, the alert module 364 may determine whether the counter value is greater than the second predetermined value (Y). If 532 is false, control may return to 504. If 532 is true, control may continue with 536. At 536, the alert module 364 may output one or more alerts via one or more output devices, such as an alert that the obstruction may be on an inner (passenger cabin facing) surface of the front windshield 270. Control may continue with 1 of FIG. 4.

Referring now to FIG. 6, at 604, the frequency module 336 may start a timer. The timer increases as time passes after being started. At 608, the frequency module 336 determines the initial frequency based on the timer and the counter value. The frequency module 336 may determine the initial frequency, for example, using one or more lookup tables and/or equations that relate timer values and counter values to initial frequencies.

For example, when the counter value is less than a first predetermined counter value (a1) and the timer is less than a first predetermined timer value (t1), the frequency module 336 may set the initial frequency to a first predetermined frequency (level 1). When the counter value is less than a second predetermined counter value (a2) but greater than the first predetermined value (a1) and the timer is greater than the first predetermined timer value (t1) but less than a second predetermined timer value (t2), the frequency module 336 may set the initial frequency to a second predetermined frequency (level 2) that is greater than the first predetermined frequency. When the counter value is less than a third predetermined counter value (a3) but greater than the second predetermined value (a2) and the timer is greater than the second predetermined timer value (t2) but less than a third predetermined timer value (t3), the frequency module 336 may set the initial frequency to a third predetermined frequency (level 3) that is greater than the second predetermined frequency. When the counter value is less than a fourth predetermined counter value (a4) but greater than the third predetermined counter value (a3) and the timer is greater than the third predetermined timer value (t3) but less than a fourth predetermined timer value (t4), the frequency module 336 may set the initial frequency to a fourth predetermined frequency (level 4) that is greater than the third predetermined frequency. When at least one of (a) the counter value is greater than the fourth predetermined counter value (a4) and (b) the timer is greater than the fourth predetermined timer value (t4), the frequency module 336 may set the initial frequency to a fifth predetermined frequency (level 5) that is greater than the third predetermined frequency. While these examples are provided, the present application is also applicable to setting the initial frequency in other ways. Generally, the frequency module 336 may increase the initial frequency as at least one of (a) the counter value increases and (b) the timer increases. The frequency module 336 may decrease the initial frequency as at least one of (a) the counter value decreases and (b) the timer decreases.

At 616, the obstruction module 324 determines whether the present obstruction zone 320 is obstructed. If 626 is true, control may return to 3 of FIG. 5. If 626 is false, the frequency module 336 may reset the timer value and the counter value at 620, and control may return to 1 of FIG. 4. As discussed above the frequency module 336 determines the frequency 340 based on the initial frequency and the frequency modifier 344.

Figure 7:
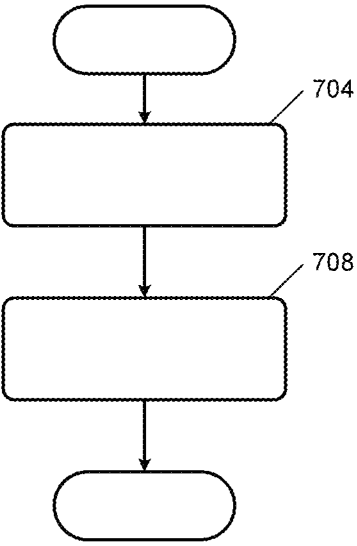
FIG. 7 is a flowchart depicting an example method of determining a frequency modifier.

FIG. 7 is a flowchart depicting an example method of determining the frequency modifier 344. Control begins with 704 where the modifier module 348 receives the input parameters 352. Examples of the input parameters 352 include weather in front of the vehicle, an amount of traffic in front of the vehicle, a type of vehicle directly in front of the vehicle, a present speed of the vehicle, and frequencies of windshield wipers of vehicles in front of the vehicle. The modifier module 348 may receive the weather data from a remote source, such as the remote server, via a transceiver module, such as the transceiver module 372. The weather in front of the vehicle may be determined based on a present location and heading of the vehicle. The modifier module 348 may receive the traffic data from a remote source, such as the remote server, via a transceiver module, such as the transceiver module 372. The traffic in front of the vehicle may be determined based on the present location and heading of the vehicle. The modifier module 348 may determine a type of vehicle directly in front of the vehicle, for example, based on one or more images from one or more cameras facing forward, such as the camera 204, the camera 208, or the camera 288. A vehicle speed sensor of the vehicle may measure the present speed of the vehicle. The modifier module 348 may receive the frequencies of windshield wipers of vehicles in front of the vehicle from the remote server (e.g., from their own instances of 432), via a transceiver module, such as the transceiver module 372.

At 708, the modifier module 348 determines the frequency modifier 344 based on the input data.

For example, the modifier module 348 may set the frequency modifier to a first predetermined modifier value (e.g., approximately 1.2 in the example of gain values) when rain (e.g., heavy rain) is in front of the vehicle. The modifier module 348 may set the frequency modifier to a second predetermined modifier value (e.g., approximately 1.5 in the example of gain values) when a truck (e.g., semi or box truck), a trailer, or another type of vehicle in a predetermined group of types of vehicles is in front of the vehicle. The modifier module 348 may set the frequency modifier to a third predetermined modifier value (e.g., approximately 1.3 in the example of gain values) when an amount of traffic in front of the vehicle is heavy. The modifier module 348 may increase the frequency modifier 344 as the vehicle speed increases and vice versa. When at least a predetermined number of vehicles in front of the vehicle have frequencies greater than a predetermined frequency (e.g., level), the modifier module 348 may set the frequency modifier 344 based on or to an average of the frequencies of the vehicles in front of the vehicle (e.g., sum of frequencies divided by total of number of vehicles used). In various implementations, the frequency modifier 344 may determine a frequency modifier based on each input parameter, such as discussed above, and set the frequency modifier 344 to a greatest one of the frequencies modifiers determined.

As discussed above, the frequency module 336 determines the frequency 340 based on the initial frequency and the frequency modifier 344.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C." In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A control system for windshield wipers of a vehicle, the control system comprising:

a gaze module configured to determine a present gaze of a driver toward a front windshield of the vehicle based on a first image from a first camera facing the driver;

an obstruction zone module configured to, based on the present gaze, determine an obstruction zone through which the driver is looking through the front windshield;

an obstruction module configured to, based on a second image from a second camera facing the front windshield, determine whether vision through the obstruction zone is obstructed;

a frequency module configured to determine a frequency at which to begin cycles of the windshield wipers of the front windshield in response to a determination that vision through the obstruction zone is obstructed; and an actuator control module configured to actuate the windshield wipers of the front windshield based on the frequency, wherein the frequency module is configured to set the frequency based on (a) a frequency modifier value and (b) an initial frequency at which to begin cycles of the windshield wipers of the front windshield, and wherein the frequency module is configured to determine the initial frequency based on a number of cycles of the windshield wipers performed since the obstruction zone became obstructed.

2. The control system of claim 1 wherein the obstruction zone module is configured to set the obstruction zone based on a predetermined shape of predetermined dimensions centered at a point where the present gaze of the driver intersects the front windshield.

3. The control system of claim 2 wherein the predetermined shape is a rectangle.

4. The control system of claim 1 wherein the frequency module is configured to set the frequency further based on one of (a) the frequency modifier value plus the initial frequency and (b) the frequency modifier value multiplied by the initial frequency.

5. The control system of claim 1 wherein the frequency module is configured to increase the initial frequency as the number of cycles increases.

6. The control system of claim 1 wherein the frequency module is configured to determine the initial frequency further based on a period that vision through the obstruction zone has been obstructed.

7. The control system of claim 6 wherein the frequency module is configured to increase the initial frequency as the period increases.

8. The control system of claim 1 further comprising a modifier module configured to determine the frequency modifier value based on a weather condition in front of the vehicle.

9. The control system of claim 8 wherein the modifier module is configured to increase the frequency modifier value when the weather condition in front of the vehicle includes rain.

10. The control system of claim 1 further comprising a modifier module configured to determine the frequency modifier value based on a type of a second vehicle that is in front of the vehicle.

11. The control system of claim 10 wherein the modifier module is configured to increase the frequency modifier value when the type of vehicle is one of a predetermined group of types of vehicles.

12. The control system of claim 1 further comprising a modifier module configured to determine the frequency modifier value based on a traffic condition in front of the vehicle.

13. The control system of claim 12 wherein the modifier module is configured to increase the frequency modifier value when the traffic condition in front of the vehicle includes more than a predetermined amount of traffic.

14. The control system of claim 1 further comprising a modifier module configured to determine the frequency modifier value based on a present speed of the vehicle.

15. The control system of claim 14 wherein the modifier module is configured to increase the frequency modifier value as the present speed of the vehicle increases.

16. The control system of claim 1 further comprising a modifier module configured to determine the frequency modifier value based on a second frequency of beginning cycles of second windshield wipers of a second front windshield of a second vehicle in front of the vehicle.

17. A control system for windshield wipers of a vehicle, the control system comprising:

a gaze module configured to determine a present gaze of a driver toward a front windshield of the vehicle based on a first image from a first camera facing the driver;

an obstruction zone module configured to, based on the present gaze, set an obstruction zone through which the driver is looking through the front windshield based on a predetermined shape of predetermined dimensions centered at a point where the present gaze of the driver intersects the front windshield;

an obstruction module configured to, based on a second image from a second camera facing the front windshield, determine whether vision through the obstruction zone is obstructed;

a frequency module configured to determine a frequency at which to begin cycles of the windshield wipers of the front windshield in response to a determination that vision through the obstruction zone is obstructed;

an actuator control module configured to actuate the windshield wipers of the front windshield based on the frequency, wherein the frequency module is configured to set the frequency based on (a) a frequency modifier value and (b) an initial frequency at which to begin cycles of the windshield wipers of the front windshield, wherein the frequency module is configured to set the frequency based on one of (a) the frequency modifier value plus the initial frequency and (b) the frequency modifier value multiplied by the initial frequency, wherein the frequency module is configured to determine the initial frequency based on (a) a period that vision through the obstruction zone has been obstructed and (b) a number of cycles of the windshield wipers performed since the obstruction zone became obstructed; and a modifier module configured to determine the frequency modifier value based on at least one of:

a weather condition in front of the vehicle;

a type of a second vehicle that is in front of the vehicle;

a traffic condition in front of the vehicle;

a present speed of the vehicle; and a second frequency of beginning cycles of second windshield wipers of a second front windshield of a second vehicle in front of the vehicle.

18. A control system for windshield wipers of a vehicle, the control system comprising:

a gaze module configured to determine a present gaze of a driver toward a front windshield of the vehicle based on a first image from a first camera facing the driver;

an obstruction zone module configured to, based on the present gaze, determine an obstruction zone through which the driver is looking through the front windshield;

an obstruction module configured to, based on a second image from a second camera facing the front windshield, determine whether vision through the obstruction zone is obstructed;

a frequency module configured to determine a frequency at which to begin cycles of the windshield wipers of the front windshield in response to a determination that vision through the obstruction zone is obstructed;

an actuator control module configured to actuate the windshield wipers of the front windshield based on the frequency, wherein the frequency module is configured to set the frequency based on (a) a frequency modifier value and (b) an initial frequency at which to begin cycles of the windshield wipers of the front windshield; and a modifier module configured to determine the frequency modifier value based on a second frequency of beginning cycles of second windshield wipers of a second front windshield of a second vehicle in front of the vehicle.

19. The control system of claim 18 wherein the obstruction zone module is configured to set the obstruction zone based on a predetermined shape of predetermined dimensions centered at a point where the present gaze of the driver intersects the front windshield.

20. The control system of claim 19 wherein the predetermined shape is a rectangle.

* * * * *